Sept. 30, 1924.                    L. W. RICE                    1,509,981
                              BEVERAGE SHAKER
                            Filed June 21, 1924
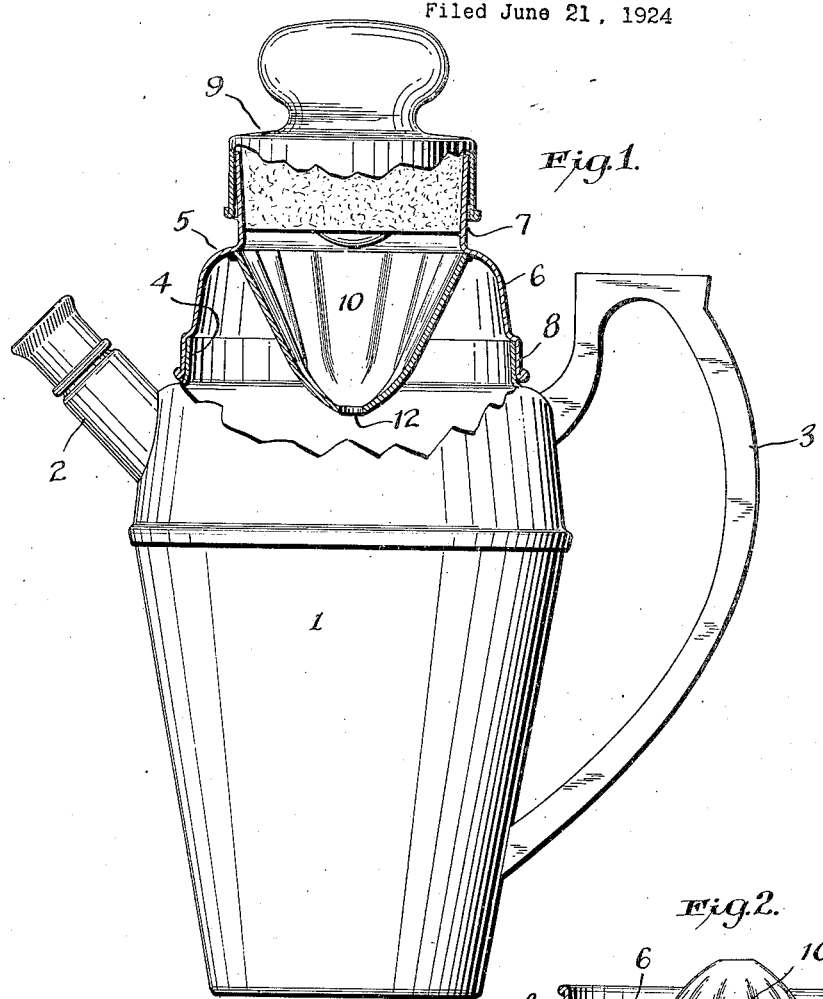
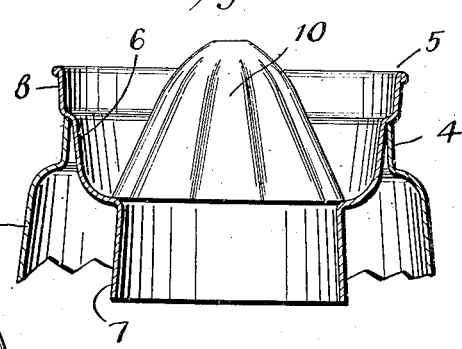
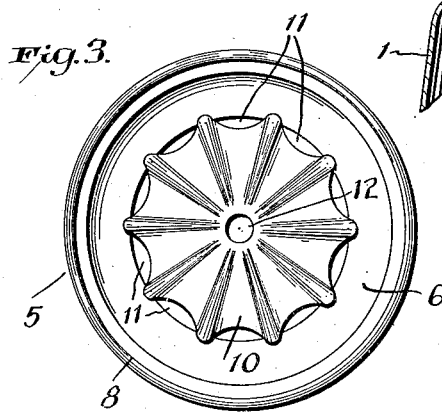
INVENTOR
BY
ATTORNEY Patented Sept. 30, 1924.

1,509,981

UNITED STATES PATENT OFFICE.

LOUIS W. RICE, OF NEW YORK, N. Y.

BEVERAGE SHAKER.

Application filed June 21, 1924. Serial No. 721,393.

*To all whom it may concern:*

Be it known that I, LOUIS W. RICE, a citizen of the United States, residing at 325 Fifth Avenue, in the county of New York and State of New York, have invented new and useful Improvements in Beverage Shakers, of which the following is a specification.

The object of the invention is to provide a beverage shaker having means to facilitate and improve the mixing of the ingredients, the said means also serving as a lemon or orange squeezer for introducing the fruit juice.

In the accompanying drawing forming part hereof:

Fig. 1 is a view of the device partly in elevation and partly in vertical section, showing all the parts assembled in what may be termed the normal relation;

Fig. 2 is a fragmentary vertical section of the upper part of the shaker, with the top removed and the intermediate part inverted in the top of the vessel; and Fig. 3 is a plan view of the intermediate part.

The shaker comprises an upright body 1 having a spout 2 and a handle 3. The body terminates at the top in a wide-mouth rim 4. A separate part 5 is formed with breast and neck portions 6, 7, the breast portion having a flange 8 adapted to fit tightly over the rim 4. The neck 7 receives a top 9.

The intermediate part 5 contains a hollow fluted dome 10, the basal edges of which are united to the interior of the shell adjacent the junction between the breast and neck portions, the dome depending within the wide breast portion. The fluted dome is united, as by soldering, to the part 5 at the bases of the flutes only, so that openings 11 are formed around the basal edge of the dome at the ends of the grooves between the flutes, and there is also an opening 12 in the center of the dome.

The dome projecting into the interior of the vessel promotes the mixing when the ingredients and the ice are shaken up. The liquid that passes into the interior of the dome drains out through the opening 12.

In the preparation of the mixture, the intermediate part is adapted to be inverted and placed in the mouth of the body, the shoulder 14 resting on the rim 4, so that the fluted dome 10 stands upright, as seen in Fig. 2. The part is then adapted to serve as a fruit squeezer, the juice passing from the bowl formed by the inverted breast portion, through the openings 11, into the body of the vessel.

The removability of the breast of the vessel affords an extra wide mouth for the introduction of ice or into which liquids may be poured. Liquid can also be poured into the neck 7 when the breast and neck are in place, and will find its way into the vessel notwithstanding the presence of the dome, by reason of the openings 11, 12.

What I claim as new is:

A beverage shaker comprising a body having a wide mouth, a top, and an intermediate reversible part comprising a breast portion having a flange to fit said mouth and a neck to receive the top, said intermediate part containing a fluted dome depending within its breast portion, said dome being united to the interior of the intermediate part at the region of the junction between the breast and neck portions at the bases of the flutes, leaving basal openings at the ends of the grooves between the flutes.

LOUIS W. RICE.